United States Patent [19]

Kulakowski et al.

[11] Patent Number: 5,132,853
[45] Date of Patent: Jul. 21, 1992

[54] ALLOCATION PROCEDURES FOR OPTICAL DISK RECORDERS

[75] Inventors: John E. Kulakowski; Rodney J. Means, both of Tucson, Ariz.

[73] Assignee: International Business Machines Corporation, Armonk, N.Y.

[21] Appl. No.: 504,529

[22] Filed: Apr. 4, 1990

Related U.S. Application Data

[62] Division of Ser. No. 153,673, Feb. 8, 1988.

[51] Int. Cl.$^5$ .................................................. G11B 5/09
[52] U.S. Cl. ......................................... 360/48; 360/66; 369/59
[58] Field of Search ........................ 360/48, 66; 369/59

[56] References Cited

U.S. PATENT DOCUMENTS

| | | | |
|---|---|---|---|
| 4,429,363 | 1/1984 | Duke et al. | 364/200 |
| 4,535,439 | 8/1985 | Satoh et al. | 369/32 |
| 4,733,386 | 3/1988 | Shimai | 369/59 |
| 4,760,566 | 7/1988 | Kobayoshi et al. | 360/66 |
| 4,775,969 | 10/1988 | Osterlund | 369/59 |
| 4,779,189 | 10/1988 | Legvold et al. | 364/200 |
| 4,924,327 | 5/1990 | Seamons et al. | 360/98 |
| 4,924,330 | 5/1990 | Scamons et al. | 360/60 |

FOREIGN PATENT DOCUMENTS

| | | |
|---|---|---|
| 223611 | 11/1986 | European Pat. Off. |
| 212099 | 3/1987 | European Pat. Off. |
| 58-143408 | 8/1983 | Japan .................................. 360/48 |

OTHER PUBLICATIONS

"The Norrow Disk Companion" ©1988, Peter Norrow Computing, Inc.
"Magnero-optics Combines erasability and high-density storage" by S. Ohr, Electronics Designs Jul. 1985.
"Disc controller supports both rigid & floppy drives" by G. Thomsen EDN Oct. 1984.
"Ein Filesevve mit Unix Schnitfstelle für Echtzeitanwendurgen" by F. Sonnenschein Feb. 1988.
"Circular Scan of VTOC Usage Map", Chou et al., IBM TDB vol. 26 #5 Oct. 1983.
"Directory For Disk with Write-Once Storage Medium"-IBM TDB, vol. 30, #6, Nov. 1987.
"IBM's PC filing system" by F. Stubbs, Electronics & Wireless World Oct. 1986.
Mastering DOS 2nd Ed. Judd Robbins Sybex Publishers 1987 pp. 484-488.
Disk Operating System V3.20 IBM First Edition 1986 Ch 3.
Norton Utilities V4.0 Users Manual Peter Norton Computing 1987.
Product Bulletin WD1002-27X, Franklin Telecommunications Apr. 21, 1987.
Bahl, Introduction to IBM Direct Access Storage Devices, Science Research Associates 1981.
Peter Norton Inside OS/2 by R. Latore & P. Norton Brady Books 1988.

*Primary Examiner*—Vincent P. Canney
*Attorney, Agent, or Firm*—H. F. Somermeyer

[57] ABSTRACT

A large capacity data storing disk includes a volume table of contents (VTOC) which identifies allocated ones of data storage tracks and identification of the data contents therein, indications of unallocated data storage track and an indication of which of the data storage tracks on the large capacity disk surface are unformatted. The indications may also include indications of unallocated "erased" tracks that do not contain data residuals from previous recordings. Those unallocated tracks having such erased condition in a count key data record format (CKD) require a home address record on each of the formatted tracks. The home address record may include indications of rotational position of defects to be skipped over during the recording and readback operations. A specific embodiment of the invention using a magnetooptic record medium is described.

20 Claims, 3 Drawing Sheets

ALLOCATION PROCEDURES FOR OPTICAL DISK RECORDERS

RELATED APPLICATION

This application is a division of Ser. No. 153,673 filed Feb. 8, 1988.

DOCUMENTS INCORPORATION BY REFERENCE

INTRODUCTION TO IBM DIRECT ACCESS STORAGE DEVICES, component SR21-3208, Science Research Associates, Inc., 1990.

Kulakowski et al., U.S. Pat. No. 4,814,903.

BACKGROUND OF THE INVENTION

1. Field of the Invention

The present invention relates to data storage and record media each having an extremely large data storing capacity, particularly apparatus and methods for employing such media in a user data processing or other information handling environment.

2. Description of the Prior Art

Rewritable or erasable media have been used for years for recording all forms of information-bearing signals. In data processing environments, such media should exhibit low error rates for ensuring data integrity and rapid storage and recovery of data. Typically, rewritable or erasable media have been of the magnetic recording type. Such magnetic media has taken the form of magnetic tapes, magnetic disks (direct access storage devices—DASD) and magnetic drums. When such disk media are first used in a recording environment, each medium has to be initialized for recording, including formatting. Such formatting, depending upon the environment, may include an extensive surface analysis with the recording of control information in various addressable data storage areas of the record medium. Typically, in large capacity magnetic storage disks, such a control record is often called a home address (HA) record as set forth in the Bohl document (pages 73 and 74). Such initialization and surface analysis results in identification of the location of media defects. Then the locations and extents of such media defects are recorded in the home address area. This arrangement allows a recorder to skip over the identified defects. Such arrangements, improve the yield of magnetic media and, therefore, greatly reduce the cost.

Another example of magnetic disk initialization is the formatting of the so-called flexible diskettes used on today's personal computers. Such diskettes are often referred to as being "soft sectored". To enable the personal computer to record and read data on and from such diskettes, a format operation by the personal computer does a surface analysis for identifying unrecordable areas on the diskette and for recording control indicia on the diskette for enabling the recording operations.

A problem arises for a user or customer of such media when the media data storing capacity becomes extremely large, such as in the gigabyte range. Then the time required for such soft sectoring and initialization may become oppressive. Accordingly, a better solution to the present day soft sectoring and media initialization is desired.

The above referred to magnetic disk media can be overwritten without first erasing the previous contents. In some magnetic media, such as many magnetic tapes, such overwriting was usually preceded by an erasing step. In the magnetic tape situation, where erasure is first provided, the procedure of so-called "updating data records in place" is not permitted. As a result, magnetic tape was usually written from the beginning of the tape to the end of the tape in one pass for the above stated reason and other operating parameters beyond the scope of the present description.

Optical recording media has almost an order of magnitude greater data capacity for a given sized recording area than the current day magnetic recording media. Many current day optical media are hard sectored, i.e., the sector marks are molded into the media before shipment from a media factory. Such molding occupies media space which could be used for data storage. Also such media to date has been write once/read many (WORM). On the other hand, magnetooptic media is rewritable but currently requires that the previous recordings be erased before new data is recorded in any given data storing area. Therefore, to update a data record recorded on a magnetooptic medium requires a first scan of the record area for erasing the previously recorded data, a second scan over the record area to record the updated version of the data and when write or record verification is required or desired a third scan for reading the just recorded updated data. For magnetooptic disk media, a complete rotation of the disk is required between the erase scan and the write scan resulting in a relatively low performance magnetooptic recorder. While a separate erase head and a separate write head could be provided on two different actuators, the attendant cost could make magnetooptic recorders noncompetitive. Accordingly, it is desired to provide better control procedures for using magnetooptic media in information-bearing signal recorders. Such erase-before-record requirements also presently exist in the so-called phase-change optical disks wherein the recording is represented by the material phases of amorphous and crystalline states.

Optical media, including magnetooptic and phase change, are currently subject to many media defects. Since the recording density per unit area is much higher, the sensitivity of the recording to small defects becomes pronounced. Accordingly, such optical media even though being of a high quality, exhibits a high error rate because of the small areas of the media surface employed for recording information-bearing signals.

When such media are employed for use in a data processing environment, a most efficient use of the media is provided by the so-called "count key data" format as described in Bohl supra, on page 27 and pages 73-75. Another format commonly used in recording information-bearing signals is the fixed block architecture format which arbitrarily divides the disk surface into addressable areas containing a fixed number of recorded signals such as 2 K, 4 K bytes per addressable area. Such formatting requires identification of all of the fixed bytes areas. The fixed block architecture is referred to and described on pages 27-28, 82-84 and 125 and 126 of the Bohl book supra. Such fixed block architecture is often found on lower performing data processing environments, such as in the personal computer environment.

A significant difference between the CKD and the fixed block architecture is that the CKD format uses only an index mark for each of the record tracks on a disk plus a home address area and count fields as referred to above. The record size is variable such that the data records are recorded as units of contiguous signals not dissected and distributed into a group of fixed block-size sectors. Further, when recording a large number of small records in CKD, a relatively large number of control signals are associated with such small records; still all of the data storage space can be used for the data and the control records rather than leaving unrecorded areas as found in fixed block architecture. Accordingly, means are desired for effectively using the CKD format on optical disks in an efficient and low cost manner. Such efficient use may require the interactivity between a control unit and a recorder and in some circumstances, interactive operation between a host processor, a control unit and a recorder.

SUMMARY OF THE INVENTION

In accordance with the present invention, a record medium having a multiplicity of addressable record tracks is received unformatted and not surface analyzed (unprocessed, herein termed "new") in a user environment. Each of the new record tracks has an index for indicating its beginning point. In the user environment, a first initialization of the record medium for signal recording includes the steps of surface analyzing a selected subset consisting of a predetermined number of said new record tracks with the predetermined number being substantially less than the total number of tracks on the record medium. The detected surface defects are indicated and identified by location and extent. The surface analyzed tracks are then formatted. In such formatting, the indication is recorded in a so-called home address area of each of the surface analyzed tracks which includes recording indications of the track positions and extent of the surface defects. Such formatted record tracks can now receive and store data.

A volume table of contents (VTOC) recorded in one or more of said record tracks includes identification of which tracks of disk 30 are in the surface analyzed and formatted sets; which tracks are yet unformatted and not surface analyzed. When a record medium is hard sectored, the individual addressable sectors can be demarked with alternate sectors being assigned to receive the data.

As the record medium is used, the VTOC is updated for indicating which of the tracks in the set are allocated for data storage and which are free and available for allocation. When the record medium is not being used for recording signals thereon or reading signals therefrom, additional ones of the new tracks are surface analyzed "in-line" and identified in VTOC as being available for formatting. Once formatted, such tracks are available for data recording. This in-line surface analysis and formatting is repeated until all of the record tracks in the record medium have been surface analyzed and formatted. The term "in-line" means that media formatting and surface analysis is automatically interleaved between day-to-day data processing operations.

When a record medium requires erasure of previously recorded data before new data is recorded, the VTOC includes indications of which tracks are unallocated and have been erased, i.e., ready to receive data, and which tracks are unallocated but not yet erased. When the record medium is not being used for recording data or for reading data, then the unallocated, not-yet-erased tracks are erased "in-line" for making them more readily available for data recording. In a specific aspect of the invention, whenever the record medium has used but unallocated tracks that are not yet erased, all erasure procedures are completed before additional ones of the new record tracks are surface analyzed and then formatted.

A host processor employing the record medium for data storage can determine that a sequential data set is being recorded and that the recording can be applied to any of the unallocated and erased record tracks rather than to the record tracks previously storing such a sequential data set. This procedure eliminates the erasure step to be interleaved between the request for recording and the actual recording.

The foregoing and other objects, features, and advantages of the invention will be apparent from the following more particular description of preferred embodiments of the invention, as illustrated in the accompanying drawings.

DETAILED DESCRIPTION

Figure 1:
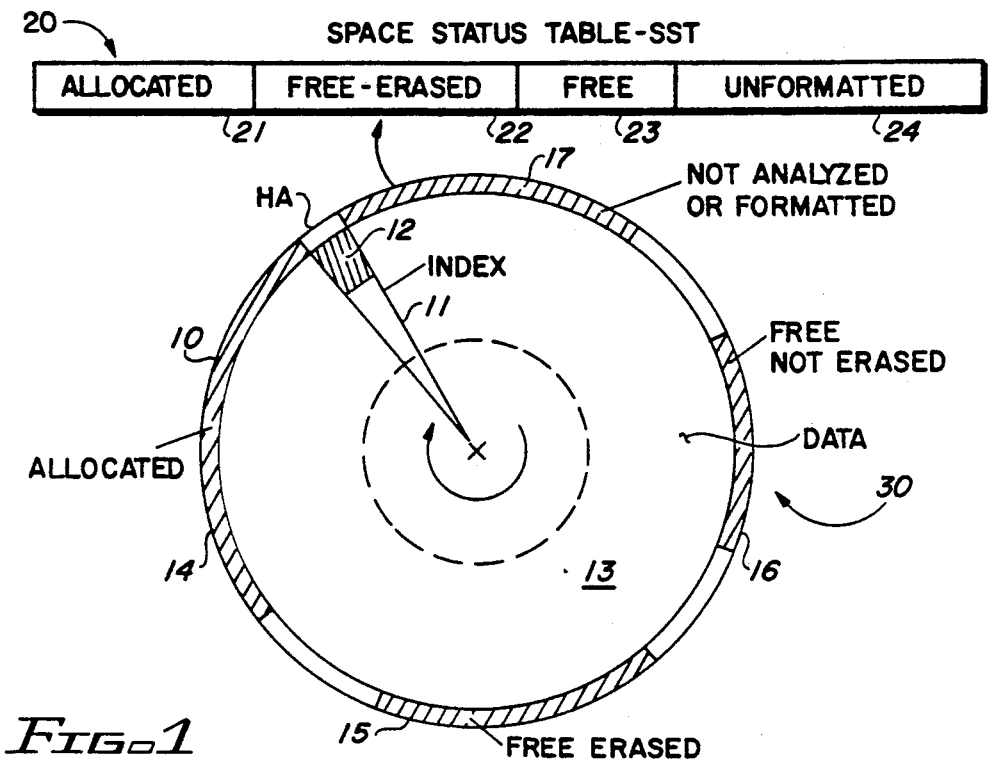
FIG. 1 diagrammatically illustrates a record medium using the present invention.

Referring now more particularly to the drawing, like numerals indicate like parts and structural features in the various figures. As usual, magnetooptic disk 30 has a volume table of contents (VTOC) 10 recorded in the radially-outermost track of the disk. The addresses of the concentric tracks (not shown) in data area 13 on disk 30 begin with the lowest address track as the radially-outwardmost track and increasing addresses to the radially-inwardmost track. Disk 30 has a single radially-extending index line 11 which signifies the beginning of the recording area for each of the record tracks of disk 30. In the initial area of each record track is a home address area HA 12. Such record tracks can be concentric separate tracks, convolutions of a single spiral track, logical tracks superposed on other physical indicia, etc.

VTOC 10, in accordance with the present invention, includes four recorded areas identified space utilization of recording area 13. It is to be appreciated that VTOC 10 includes other information than that described for practicing the present invention. In a first VTOC area 14, all of the record tracks of disk 30 that are currently allocated for storing information-bearing or data signals are identified. Such identification can be by the physical address referred to above, can be a directory which allows indirect addressing from a logical address base to the physical address base or other form of indication. A second VTOC area 15 identifies the physical addresses of the free and erased record tracks of disk 30. Such free and erased record tracks are unallocated for data storage but have been erased, as will become apparent, and therefore, are ready to receive data signals for recording. A third VTOC section 16 identifies the free (unallocated) tracks that are not yet erased. Such free tracks are identified by the physical addresses are those that were previously recorded into and have been deallocated from storing data. Therefore the free, not erased tracks are available for allocation but are not yet ready to receive recorded information in those disks 30 that require erasure of previously-recorded data before new data can be recorded. When a disk 30 has the capability of overwriting recorded data, then the third VTOC section 16 may be dispensed with. A fourth VTOC area 17 identifies the radially-outwardmost ones of the new non-analyzed plus the surface-analyzed but unformatted record tracks. The formatted record tracks have a HA record recorded therein (as later described) whereas the unformatted tracks have been surface analyzed but have no home address record recorded therein. The new tracks have not yet been surface analyzed.

In a preferred embodiment of the invention, the shaded area of HA 12 represents a radially outward and abbreviated set of record tracks initially formatted for receiving data signals for storage; thence indicated in first VTOC section 14. The fourth VTOC area 17 identifies the radial track of disk 30 which is a next radially inward track that has not been surface analyzed plus the radially-outermost track that was surface analyzed but not yet formatted.

Figure 3:
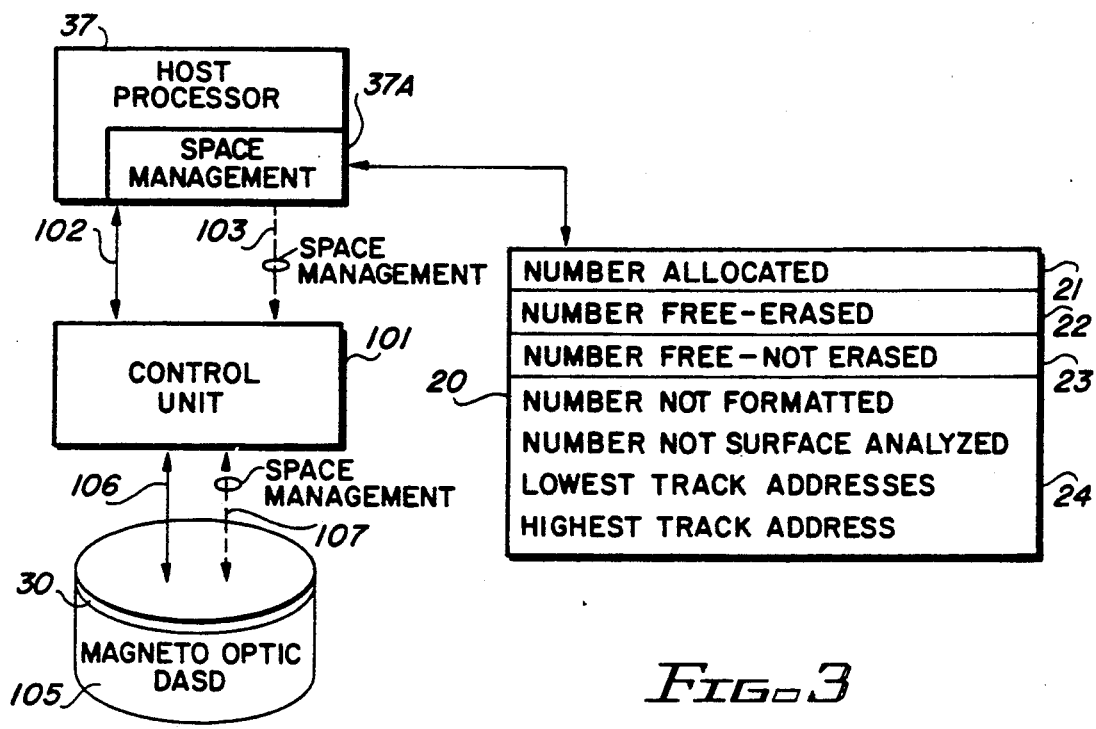
FIG. 3 is a simplified block diagram of a host processor and control unit connected to the FIG. 2-illustrated recorder.

The space management of disk 30 can be performed in a host processor attaching a data storage system having a later-described programmable control unit. Such programmed space management needs information stored in VTOC 10 for the space management functions. The space management functions may be performed in the programmable control unit instead of a host processor. In either event, the machine operations perform the same functions as later set forth. The term "space management" means either a host processor or control unit executing computer programs for performing the machine operations shown in FIGS. 4 and 5. As shown in FIG. 3, the host processor has the space management.

For improving performance, a portion of VTOC 10 is inserted into later-described program space status table (SST) 20. SST 20 is created from VTOC 10 each time the recorder is powered on, reset, etc. SST 20 has four portions corresponding to the four VTOC areas 14-17. "Allocated" field 21 of SST 20 contains a subset of VTOC area 14. The SST 20 stored "allocated" information can be the total number of allocated tracks of disk 30, and identification of a predetermined set of the last referenced ones of the allocated set of tracks. For example, up to fifty of the allocated tracks can be identified in field 21. Similarly, the free and erased tracks identified in second VTOC portion 15 have some of their addresses recorded in field 22 of SST 20. For example, the twenty radially-outwardmost ones of the free and erased tracks may be identified in SST 20. In an alternate arrangement, the free and erased tracks that have an address affinity to the allocated tracks identified in field 21 can be listed in field 22. Such affinity is the radial proximity of the free and erased tracks to the allocated tracks last referenced. A third SST 20 field 23 identifies the free but not erased tracks. Such free but not erased tracks are preferably a radially-outwardmost set of the free and erased tracks for enabling a quick examination of which tracks can be next erased. Also the total number of free and erased tracks and the free but not erased tracks are respectively stored in fields 22 and 23. Such numbers can also be used for analysis of the disk 30 usage. Finally, in SST 20, field 24 contains the physical addresses of the radially-outwardmost one of the raw, not surface-analyzed and unformatted tracks of disk 30. Such information may be used for load balancing and other purposes as may be devised in a data processing environment.

Figure 2:
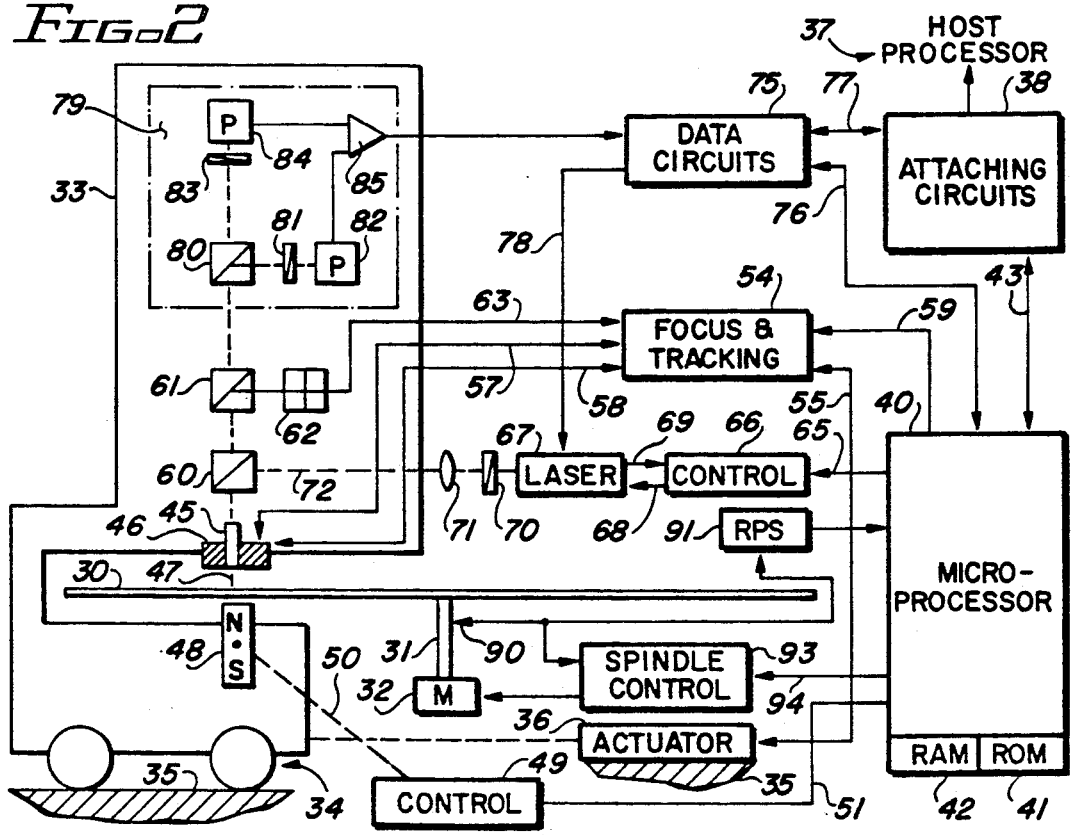
FIG. 2 is a block diagram showing a recorder of the magnetooptic type which employs the FIG. 1-illustrated record medium.

An optical recorder with which the present invention may be advantageously employed is shown in FIG. 2. A magnetooptic record disk 30 is mounted for rotation on spindle 31 by motor 32. Optical head-carrying arm 33 on head arm carriage, generally denoted by numeral 34, moves radially of disk 30. A frame 35 of the recorder suitably mounts carriage 34 for reciprocating radial motions. The radial motions of carriage 34 enable access to anyone of a plurality of concentric tracks or circumvolutions of a spiral track for recording and recovering data on and from the disk. Linear actuator 36 suitably mounted on frame 35, radially moves carriage 34 for enabling the track accessing. The recorder is suitably attached to one or more host processors 37, such host processors may be control units, personal computers, large system computers, communication systems, image process processors, and the like. Attaching circuits 38 provide the logical and electrical connections between the optical recorder and the attaching host processors 37.

Microprocessor 40 controls the recorder including the attachment to the host processor 37. Control data, status data, commands and the like are exchanged between attaching circuits 38 and microprocessor 40 via bidirectional bus 43. Included in microprocessor 40 is a program or microcode storing, read-only memory (ROM) 41 and a data and control signal storing random access memory (RAM) 42.

The optics of the recorder include an objective or focussing lens 45 mounted for focussing and tracking motions on head arm 33 by fine actuator 46. This actuator includes mechanisms for moving lens 45 toward and away from disk 30 for focussing and track following and seeking movements radially of disk 30; for example, for changing tracks within a range of 100 tracks so that carriage 34 need not be actuated each time a track adjacent to a track currently being accessed is to be accessed. Numeral 47 denotes the two-way light path between lens 45 and disk 30.

In magnetooptic recording, magnet 48 provides a weak magnetic steering field for directing the remnant magnetization direction of a small spot on disk 30 illuminated by laser light from lens 45. The laser light spot heats the illuminate spot on the record disk to a temperature above the Curie point of the magnetooptic layer (not shown, but can be an alloy of rare earth and transitional metals as taught by Chaudhari et al., U.S. Pat. No. 3,949,387). This heating enables magnet 48 to direct the remnant magnetization to a desired direction of magnetization as the spot cools below the Curie point temperature. Magnet 48 is shown as oriented in the "write" direction, i.e., binary ones are recorded on disk 30 normally are "north pole remnant magnetization". To erase disk 30, magnet 48 rotates so the south pole is adjacent disk 30. Magnet 48 control 49 which is mechanically coupled to rotatable magnet 48 as indicated by dashed line 50, controls the write and erase directions. Microprocessor 40 supplies control signals over line 51 to control 49 for effecting reversal of the recording direction.

It is necessary to control the radial position of the beam following path 47 such that a track or circumvolution is faithfully followed and that a desired track or circumvolution is quickly and precisely accessed. To this end, focus and tracking circuits 54 control both the coarse actuator 36 and fine actuator 46. The positioning of carriage 34 by actuator 36 is precisely controlled by control signals supplied by circuits 54 over line 55 to actuator 36. Additionally, the actuator control by circuits 54 is exercised by control signals travelling over lines 57 and 58 respectively for focus and fine tracking and switching actions of fine actuator 46. Various servo positioning controls may be successfully employed.

The focus and tracking position sensing is achieved by analyzing laser light reflected from disk 30 over path 47, thence through lens 45, through one-half mirror 60 and to be reflected by half-mirror 61 to a so-called "quad detector" 62. The symbol 62 also includes optics, such as a hemicylinder lens, for processing a light beam before the beam impinges on the detector surfaces. Quad detector 62 has four photo elements which respectively supply signals on four lines collectively denominated by numeral 63 to focus and tracking circuits 54. Aligning one axis of the detector 62 with a track center line, track following operations are enabled. Focussing operations are achieved by comparing the light intensities detected by the four photo elements in the quad detector 62. Focus and tracking circuits 54 analyze the signals on lines 63 to control both focus and tracking.

Recording or writing data onto disk 30 is next described. It is assumed that magnet 48 is rotated to the desired position for recording data. Microprocessor 40 supplies a control signal over line 65 to laser control 66 for indicating that a recording operation is to ensue. This means that laser 67 is energized by control 66 to emit a high-intensity, laser light beam for recording; in contrast, for reading, laser 67 emits a reduced-intensity beam that does not heat the illuminated spot on disk 30 above the Curie point. Control 66 supplies its control signal over line 68 to laser 67 and receives a feedback signal over line 69 indicating the laser 67 emitted light intensity. Control 68 adjusts the light intensity to the desired value. Laser 67, a semiconductor laser such as a gallium arsenide diode laser, can be modulated by data signals so the emitted light beam represents the data to be recorded by such intensity modulation. In this regard, data circuits 75 (later described) supply data indicating signals over line 78 to laser 67 for effecting such modulation. This modulated light beam passes through polarizer 70 (linearly polarizing the beam), thence through collimating lens 71 toward half mirror 60 in light path 72 for being reflected toward disk 30 through lens 45. Data circuits 75 are prepared for recording the microprocessor 40 supplied suitable control signals over line 76. Microprocessor 40 in preparing circuits 75 is responding to commands for recording received from a host processor 37 via attaching circuits 38. Once data circuits 75 are prepared, data is transferred directly between host processor 37 data circuits 75 through attaching circuits 38. Data circuits 75 also has ancillary circuits (not shown) relating to disk 30 ancillary or format signals, error detection and correction signals and the like. Circuits 75, during a read or recovery action, strip the ancillary signals from the readback signals before supplying corrected data signals over bus 77 to host processor 37 via attachment 38.

Reading or recovering data from disk 30 for transmission to a host processor requires optical and electrical processing of the laser light beam from the disk 30. That portion of the reflected light (which has its linear polarization from polarizer 70 rotated by disk 30 recording using the Kerr effect) travels along the two-way light path 47, through lens 45 and half-mirrors 60 and 61 to the data detection portion 79 of the head arm 33 optics. Half-mirror or beam splitter 80 divides the reflected beam into two equal intensity beams both having the same reflected rotated linear polarization. The half-mirror 80 reflected light travels through a first polarizer 81 which is set to pass only that reflected light which was rotated when the remnant magnetization on disk 30 spot being accessed has a "north" or binary one indication. This passed light impinges on photo cell 82 for supplying a suitable indicating signal to differential amplifier 85. When the reflected light was rotated by a "south" or erased pole direction remnant magnetization, then polarizer 81 passes no or very little light resulting in no active signal being supplied by photocell 82. The opposite operation occurs by polarizer 83 which passes only "south" rotated laser light beam to photo cell 84. Photocell 84 supplies its signal indicating its received laser light to the second input of differential amplifier 85. The amplifier 85 supplies the resulting difference signal (data representing) to data circuits 75 for detection. The detected signals include not only data that is recorded but also all of the so-called ancillary signals as well. The term "data" as used herein is intended to include any and all information-bearing signals, preferably of the digital or discrete value type.

The rotational position and rotational speed of spindle 31 is sensed by a suitable tachometer or emitter sensor 90. Sensor 90, preferably of the optical sensing type that senses dark and light spots on a tachometer wheel (not shown) of spindle 31, supplies the "tach" signals (digital signals) to RPS circuit 91 which detects the rotational position of spindle 31 and supplies rotational information-bearing signals to microprocessor 40. Microprocessor 40 employs such rotational signals for controlling access to data storing segments on disk 30 as is widely practiced in the magnetic data storing disks. Additionally, the sensor 90 signals also travel to spindle speed control circuits 93 for controlling motor 32 to rotate spindle 31 at a constant rotational speed. Control 93 may include a crystal controlled oscillator for controlling motor 32 speed, as is well known. Microprocessor 40 supplies control signals over line 94 to control 93 in the usual manner.

As seen in FIG. 3, host processor 37 is operatively connected to a programmable control unit 101 by interface 102. Such interface 102 can be the interface between IBM constructed host processors and the programmable control units used in connection with such IBM host processors. In addition, dash line 103 indicates special signals supplied by host processor 37 to programmable control unit 101 in connection with space management of magnetooptic DASD 105. Such special signals travel over the interface 102 but are separately illustrated in FIG. 3 for more clearly illustrating the invention. Such signals constitute an indication that record areas that contain recorded signals can be freed, i.e., moved from the allocated status to the free but not erased status. Further such indications may include that the data being recorded by host processor 37 is of the sequential type. Rather than recording such sequential data over previously recorded tracks, space management 37A can access from SST 20 the free and erased tracks for allocation to the sequential data to be next received from host processor 37. Such allocation eliminates the need for erasing previously recorded tracks before the recording occurs. Such time saving helps the efficiency of host processor 37.

In a similar manner, control unit 101 controls the operation of magnetooptic DASD 105 as indicated by the interconnection 106. Such controls may be the control used in connection with the apparatus described by Bohl supra. Control unit 101 passes the space management control as indicated by dash line 107. As set forth in more detail in FIG. 4, such controls are particularly directed toward VTOC 10 and the surface analysis controls for initializing the disk 30 of magnetooptic DASD 105. Host processor 37 has an internal memory diagrammatically represented by SST 20 which contains the various fields described with respect to FIG. 1 and which are used by space management 37A.

Figure 4:
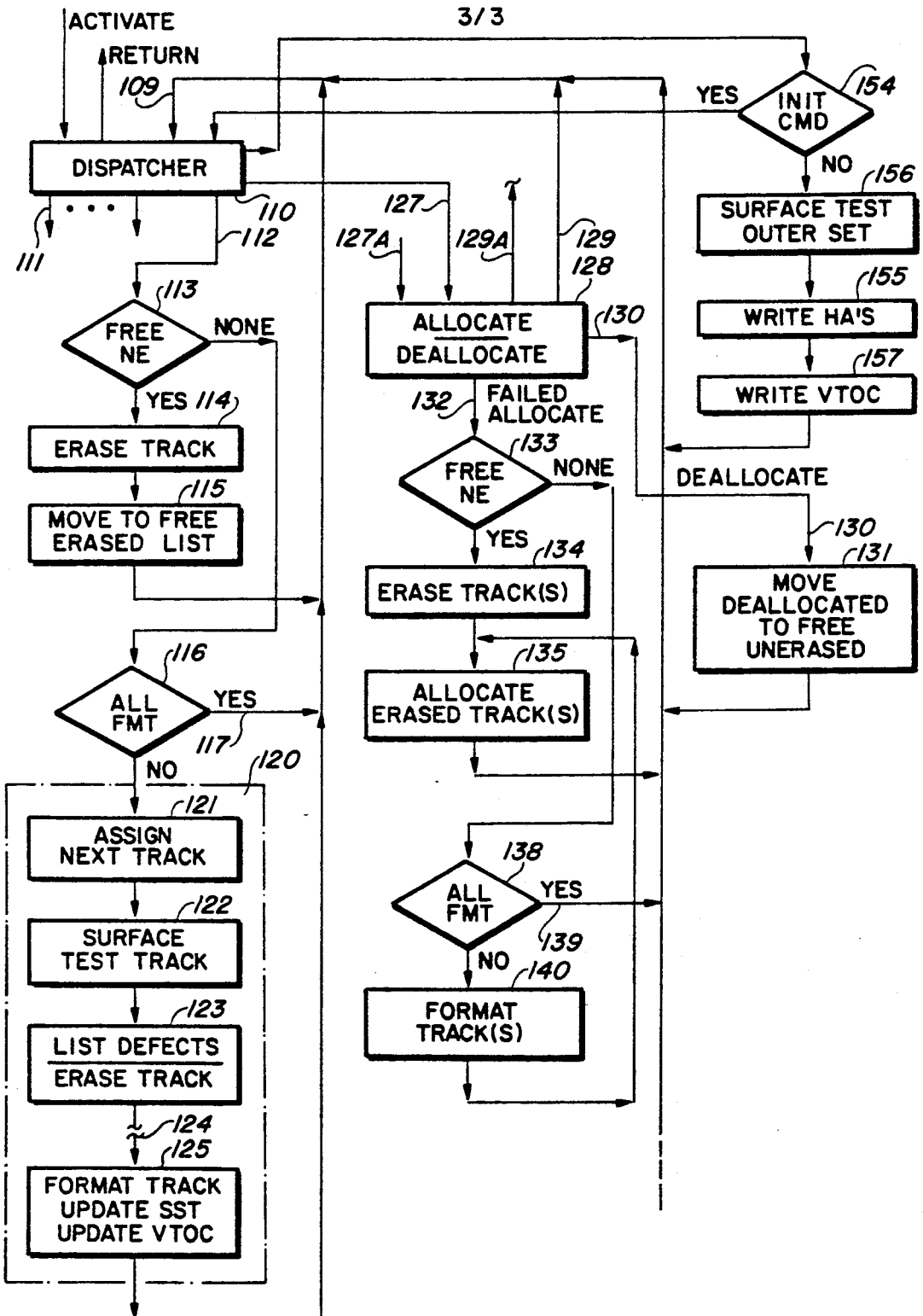
FIG. 4 is a machine operations chart of a host processor connected to the control unit of FIG. 3 showing those space management machine operations used to employ the present invention.

FIG. 4 illustrates in flowchart form the machine operations effected in the FIG. 3-illustrated apparatus by space management 37A that are pertinent to an understanding of the present invention. The host processor 37 executes programs for effecting the machine operations represented in FIG. 4. One of the programs is dispatcher 110 which coordinates operation of all space management program execution and has a design that is well known in the programming art. Activation of space management 37A is in accordance with known programming techniques. Arrows 111 represent program calls to various programs to be executed for performing machine operations not pertinent to an understanding of the present invention but which are found in a control unit for a data storage subsystem. As a practical matter, programs for implementing machine operations not pertinent to an understanding of the present invention would most likely be a greater proportion of programs executed by host processor 37. Dispatcher 110 sets a priority of execution of the various programs. A low level priority of the programs is assigned to implement one portion of the invention when the magnetooptic DASD 105 is not recording data on disk 30 nor reading data from disk 30 (i.e., not reserved or allocated). Logic path 112 represents the entry into such space management machine operations. The first machine operation indicated by numeral 113 (free NE) examines SST 20 field 23 for determining whether or not there are any tracks of disk 30 that had been deallocated but not yet erased (free but not erased—NE). Assuming there are some free NE tracks, SST 20 has a nonzero value in field 23. Space management 37A identifies a one of such tracks which may have a physical address stored in field 23 or may require access to VTOC 10 third portion 16 for identifying one free NE track. Control unit 101 then actuates the magnetooptic DASD 105 to move fine actuator 46 to the addressed track. Then control unit 101, in response to space management 37A, commands magnetooptic DASD 105 to erase that track as indicated at step 114. Upon successful completion of the track erasure, which uses normal data recording techniques, space management 37A at step 115 moves the identification of the just erased track from the third VTOC portion 16 to the second VTOC portion 15 and updates SST 20 by indicating in field 22 that the just-erased track is now ready to receive data to be recorded; the identification of any such track is deleted from the free NE field 23. At a minimum, the number of free tracks but not erased indicated in numeral 23 are reduced by one where the number of free and the number of erased tracks indicated in field 22 is increased by one. Similar counts are also stored in VTOC 10. Upon completion of machine operations step 115, the dispatcher 110 becomes active.

Under certain circumstances, the erasure of the track in step 114 may be a free-standing operation, i.e., control unit 101 may be disconnected during erasure from magnetooptic DASD and, therefore, may return to a dispatcher 110 leaving an electronic note to itself to return to the machine operation 115 when the track erasure is completed. While it is preferred that a single track be erased at a time to enable a maximum number of requested recording and readback operations, no limitation to a single track erasure is intended.

In one embodiment, when space management finds no free, not erased tracks at decision step 113, it then proceeds to decision step 116 to determine whether or not all of the record tracks of disk 30 have been formatted. It is to be understood that steps 113 and 116 may be both independently activated from dispatcher 110. Space management examines field 24 of SST 20 for determining whether or not a track address is recorded therein. If no track address is recorded or a track address having a value one greater than the address of the radially-inwardmost track of disk 30 is recorded, then space management has determined that all of the tracks of disk 30 have been formatted. At this point, space management follows program path 117 to return path 109 returning to dispatcher 110.

In the event that field 24 contains a physical address of a new track of disk 30, then one of the new tracks is then surfaced analyzed and formatted in subroutine 120. In machine operations step 121, the track identified in field 24 is the next track to be formatted and is assigned for the formatting operation. In step 122, space management 37A causes control unit 101 and magnetooptic DASD 105 to surface analyze and test the just-identified new track. Such surface analysis includes detecting and identifying surface defects for later recording in the home address area of the track being surfaced analyzed. A more detailed description of this operation is found in the above referred to co-pending commonly assigned application by Kulakowski et al. During the surface analysis, either magnetooptic DASD 105 or the control unit 101 collects the identification of the detected surface defects, their circumferential locations and extents. Upon completion of such accumulation of detected defect identifications, space management 37A moves to step 123 wherein the defects are accumulated in table form ready for recording in the home address area in the ensuing step 125. As a part of step 123, control unit 101 causes magnetooptic DASD 105 to erase the just surface-analyzed track. Following such erasure, the home address record HA is written in that track in step 125. Step 124 indicates that other data processing may be performed before step 125 effects formatting.

Upon the successful completion of track formatting, field 24 of SST 20 and VTOC 10 are updated by selecting the next higher track address (the address of the next radially-inwardmost track) for recording respectively in field 24 of SST 20 and in fourth VTOC portion 17. SST 20 and VTOC portion 15 are updated to show availability of each additional formatted track. When the radially inwardmost track is erased, the stored address is for no track, i.e., is one greater than the highest addressed track. Upon completion of machine operations step 125, program execution goes back to dispatcher 110.

Dispatcher 110 also activates allocate-deallocate module 128. Allocate-deallocate module 128 may also be called by another program module being executed for performing an allocate request generated in host processor 37. In any event, allocate-deallocate module 128 is constructed and performs operations as found in present day memory control computers which allocate and deallocate addressable data storage areas. If allocate module 128 during an allocation procedure being performed finds an unallocated erased addressable track identified either in SST 20 field 22 or in second VTOC portion 15, the allocation is successful. Such successful allocation results in indicating the allocation is complete over line 129 for enabling the host processor to command recording in the just allocated data storage area. If the allocate procedure was caused by execution of another program within host processor 37 sending a request over line 127A, then the successful allocation is indicated on line 129A to enable that program execution to be continued.

All deallocations of tracks by module 128 are successful. Each deallocation includes moving the identification of the record track or tracks being deallocated from the first VTOC portion 14 as an allocated track to third VTOC portion 16 and SST 20 which indicates the track is unallocated but not erased. Space management may not know whether or not data in fact had been recorded in the just deallocated track, however, for purposes of integrity, it is assumed that some data has been recorded in the just deallocated track. All of the above-described operations are represented in FIG. 4 by numeral 131. Execution of these operations completes the deallocation procedure for enabling dispatcher 110 to select another program for execution.

When an allocation attempt fails because there are no addressable data storage tracks identified in the second VTOC portion 15, the numbers of free and erased tracks indicated in field 22 of SST 20 and second VTOC portion 15 are zero, then space management has to be performed at the next available moment for obtaining additional allocatable data storage space.

The failed allocate program path 132 leads to decision step 133 to determine whether or not there are any free NE record tracks identified in third VTOC portion 16 as also indicated by a nonzero number in field 23 of SST 20. When SST field 23 is nonzero, then execution of the machine operations of FIG. 4 proceeds to erase tracks in step 134 for making those tracks available for allocation. Upon the completion of erasure, the number in field 23 is reduced while the number in field 22 is made nonzero; VTOC 10 is updated to reflect the erasure by moving the indication of the just erased tracks from third VTOC portion 16 to second VTOC portion 15. Following the successful completion of erasure, the just-erased tracks then are allocated in step 135 with space management then returning to dispatcher 110.

In the event there are no unallocated NE tracks detected at decision step 133, then some remaining unformatted tracks on disk 30 are processed. At decision step 138 (all FMT), space management examines SST 20 field 24 for determining whether or not there are any remaining unformatted tracks on disk 30. If there are none, all of the tracks on disk 30 have been formatted, then space management follows path 139 to dispatcher 110, i.e., there is nothing that can be done to satisfy the allocation request at this time—the disk is fully allocated. On the other hand, at decision step 138, if there are some unformatted tracks indicated by field 24 of SST 20 or fourth VTOC portion 17, then at least one of the unformatted tracks, and if more than one track has been requested, a plurality of such unformatted tracks are formatted at function step 140. Function step 140 includes all of the steps set forth with respect to formatting in the subroutine 120 and as further described in the co-pending Kulakowski et al. application supra. It is to be noted that surface analysis of the tracks may be completed yet the formatting of the analyzed tracks (step 125) may not have yet been completed. In this later instance, only step 125 of subroutine 120 is performed.

Upon completion of formatting a requisite number of unformatted tracks at step 140, space management proceeds to allocate the just formatted and erased tracks at step 135. In a practical implementation, the programming used for performing operation step 135 is a part of allocate module 128.

All of the above description relates to erasing and formatting tracks on an in-line basis in which host processor 37 interleaves such erasing operations and formatting operations between recording and readback operations. To initialize disk 30 when first placed on magnetooptic DASD 105 or when disk 30 is a nonremovable disk when magnetooptic DASD 105 is first varied on to host processor 37, space management initializes a radial-outwardmost set of record tracks for enabling recording and readback operations to ensue. In an alternative procedure, a factory may perform the initial formatting of the radially-outward tracks in disk 30 as described in the Kulakowski et al. co-pending application supra. In that event, space management does not initialize the disk 30 in a user environment. Initialization may also be instituted by space management causing control unit 101 to sense the disk 30 for VTOC 10; if there is no VTOC 10 indicates an unformatted disk. Then initialization can be started by space management. In any event, an initialization command is sensed at decision step 154. If the initialization command had previously been performed for disk 30, as can be sensed by reading VTOC 10, then no action is taken. For an uninitialized disk 30, space management proceeds from decision step 154 to a series of steps 155-157. These steps are best understood by referring to the Kulakowski et al. co-pending application. At step 156, a surface test or analysis is made of a predetermined number of radially-outwardmost tracks on disk 30. For example, the first 100 radially-outwardmost tracks are surface analyzed as described with respect to the steps 120. Upon completion of the surface analysis, the tracks are erased and home addresses (HAs) are written on the respective tracks during step 155 including the outermost track which is to receive VTOC 10. Then, at step 157, the VTOC 10 is written in the outermost track. Upon completion of this disk initialization, space management returns to dispatcher 110 for enabling host processor 37 to perform other machine operations via return path.

Figure 5:
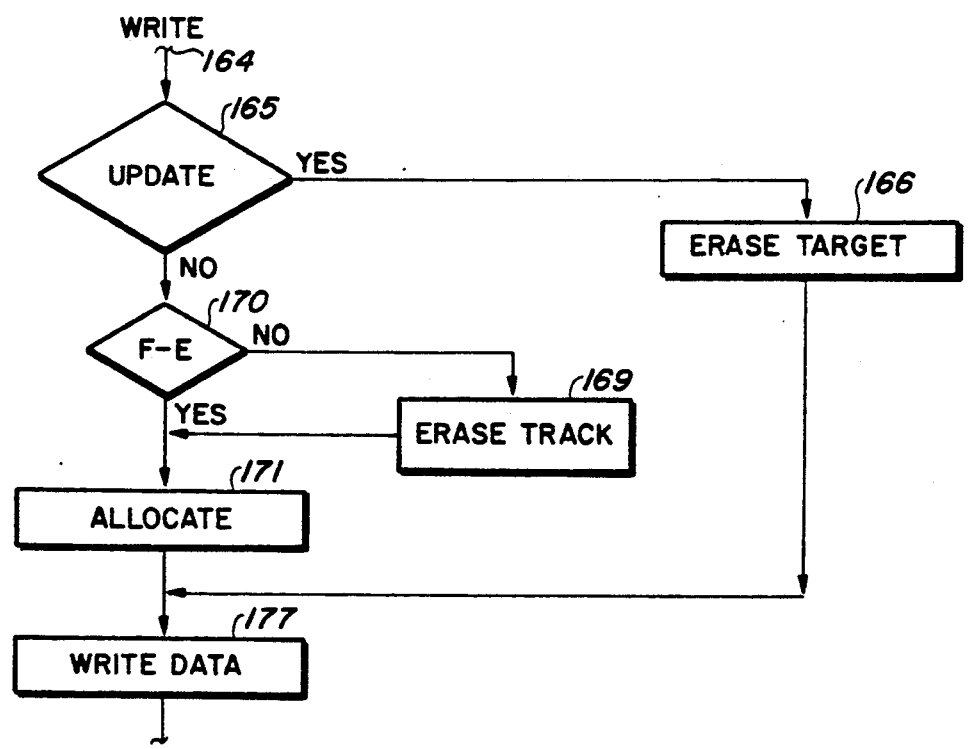
FIG. 5 is a simplified machine operations chart for the host processor for enabling certain recording operations.

FIG. 5 illustrates machine operations used when non-sequential data is being recorded, i.e., those situations wherein host processor 37 desires to maintain the data in the same track that a previous version of the data was stored. It is to be understood that host processor 37 can be programmed to allow movement of non-sequential data from track to track on disk 30 for avoiding interleaving an erasure step between a request to write and the actual writing or recording operation on disk 30. In the latter instance, the directory of the data stored on disk 30 is logical, i.e., VTOC 10 includes a directory which converts a logical number or address into a physical or track address. Such logical addressing is found in present day diskettes and hard disks are used with personal computers. In any event, assuming all of the above is not desired, then at path 164 a host processor 37 issued write command is to be executed by control unit 101. At decision step 165, space management determines whether or not it is an update write operation. If it is an update operation, i.e., new data is to replace currently stored data, then at function step 166, control unit 101 is commanded to erase the target area. A channel command retry signal is sent to host processor 37 by control unit 101 upon completion of step 165. Upon completion of the erasure at step 166, a DEVICE END signal is sent by control unit 101 to shot processor 37 signalling completion of the erasure. Then the data is written to disk 30 at function step 177. Upon completion of function step 177, host processor 37 returns to other program steps (not shown) not pertinent to an understanding of the present invention.

If on the other hand at decision step 165 space management determines that the data is original data and the write is not an update, then at decision step 170 space management determines whether or not there are any free and erased tracks ready for allocation. If not, then a track is erased as described with respect to FIG. 4 and is represented in FIG. 5 by step 169. When a free and erased track (F-E) is found by decision step 170 or upon completion of the erasure step 169, space management at step 171 allocates the track to the write operation. Then the write operation is actually performed at function step 177.

While the invention has been particularly shown and described with reference to preferred embodiments thereof, it will be understood by those skilled in the art that various changes in form and details may be made therein without departing from the spirit and scope of the invention. In particular, the invention may be applied to hard sectored media, fixed block architecture media, updatable media and the like.

What is claimed is:

1. In a machine-effected method of allocating addressable data storage areas of a data storage system for storing data, the data storage system
having a signal storage member having a plurality of the addressable data storage areas;
including the machine-executed steps of:
establishing classes for the data storage areas of allocated, and not allocated, in the not allocated class establishing subclasses of free and available subclass and free but not immediately available subclass;
assigning respective ones of the data storage areas to said classes and subclasses to represent their respective status of allocated, free and available and free and not immediately available;
allocating data to the signal storage medium for storage in one or more of the data storage areas;
in said allocating step, first searching for first predetermined one or ones of the data storage areas assigned to the free and available subclass, if any of said data storage areas are in said free and available subclass, allocate the data to such predetermined one or ones of the data storage areas, removing the predetermined one or ones from the free and available subclass and assigning same to the allocated class; and
if said first searching identifies no free and available data storage areas assigned to said free and available subclass, delaying the allocation, then searching the free and not immediately available subclass for second predetermined one or ones of the data storage areas, preparing the second predetermined one or ones of the data storage areas to receive and store said data and allocating the data to said second predetermined ones of the data storage areas and changing the second predetermined one or ones from the free and not immediately available subclass to the allocated class.

2. In the method set forth in claim 1, further including the machine-executed steps of:
selecting said storage member to have magneto-optic recording characteristics and erasing said second predetermined one or ones of the data storage areas for preparing the second predetermined one or ones of the data storage areas to receive and store said data.

3. In the method set forth in claim 2, further including the machine-effected of:
deallocating ones of the allocated tracks which may contain data stored therein; without immediately erasing such deallocated tracks as being a member of said free but not immediately available subclass of data storage space;
when the storage member is not being used for receiving signals to be recorded on the disk or for supplying recorded signals to be recorded on the disk or for supplying recorded signals from the disk, erasing said deallocated but not erased tracks; and
transferring said erased tracks in said volume table of contents which of the free tracks have been erased and which of the free tracks contain not erased data.

4. In the method set forth in claim 1, further including:
receiving an updated first data for data already recorded on the storage member;
allocating a one of said data storage areas identified in said free and available subclass tracks for receiving the updated data;
recording the updated data onto the just allocated data storage area; and
deallocating the data storage area storing the data to be updated and assigning some to said free but not immediately available subclass.

5. In the method set forth in claim 4, further including the machine-executed steps of:
receiving an indication that updated second data to be updated;
identifying those data storage areas currently allocated to receive the updated data and erasing those portions; and
then receiving the updated second data and recording same in said data storage areas allocated for the data to be updated.

6. In the method set forth in claim 1, further including the machine-executed steps of:
establishing a separate directory for said classes of data storage areas and identifying each data storage area in a one of said directories.

7. In a machine-effected method for allocating data-storage areas of a record medium for storing data therein, the medium having a large multiplicity of addressable rewritable data storage areas:

the improvement including, the steps:

establishing a volume table of contents (VTOC) recorded on the medium for indicating the data contents of the medium;

recording first machine-sensible indicia in the VTOC for indicating allocated ones of the addressable data storage areas;

recording second machine-sensible indicia in the VTOC for indicating unallocated ones of the addressable data storage areas that are still storing data; and recording third machine-sensible indicia in the VTOC for indicating unallocated ones of the addressable data storage areas that are erased and are not storing any data;

allocating ones of said addressable data storage areas identified by said third machine-sensible indicia for storing the data if the third machine-sensible indicia identify any such addressable storage areas as being unallocated and erased; and allocating one of said data storage areas identified by said second record machine-sensible indicia only when said third machine-sensible indicia do not identify any of addressable data storage areas as being unallocated and erased.

8. In the method set forth in claim 7, further including the machine-executed steps of:

establishing a second copy of the VTOC in a fast memory separate from said VTOC in the medium, performing said allocating steps using said second copy, and updating said VTOC to be identical to said second copy.

9. In the method set forth in claim 7, further including the machine-executed steps of:

establishing a separate directory for said first, second and third indicia and storing said first, second and third indicia in said established directories, respectively.

10. In a computer system having at least one high density data storage medium, said data storage medium having a large number of data storage subdivisions and requiring lengthy format times, a system for formatting said medium on a time-distributed basis, said formatting system comprising:

means for maintaining a record of status information for each of said subdivisions, said status information including an indication of whether or not said subdivision has been formatted;

means for determining when said computer system is disk-idle;

means responsive to said disk-idle determining means and to said status information record maintaining means for selecting an unformatted one of said subdivisions when said computer system is diskidle; and means for formatting an unformatted one of said subdivisions responsive to one of (a) selection by said selecting means of said unformatted one of said subdivisions upon a determination by said determining means that said computer system is diskidle, and (b) a need by said computer system for access to a formatted one of said subdivisions when said status information record maintaining means indicates that no formatted subdivision exist.

11. The formatting system of claim 10 wherein said status information record maintaining means comprises means for storing a table on said medium, said table indicating the status of each of said subdivisions.

12. The formatting system of claim 10 wherein;

said data storage medium is a magnetooptic data storage medium having magnetic domains aligned in one of two directions representing logical 0 and logical 1 and having a magnet for applying a bias magnetic field, alignment of said magnetic domains being substantially fixed at room temperature, said magnetic domains aligning themselves with said bias magnetic field at temperatures above a threshold temperature, said data storage medium further having associated therewith means for generating a beam of coherent electromagnetic radiation for generating a beam of coherent electromagnetic radiation for heating said medium to said threshold temperature for aligning said domains as desired and for reading data represented by the alignment of said domains; and said formatting means comprises;

means for aligning said bias magnetic field in the direction representing logical 0;

means for causing said coherent beam generating means to generate a first coherent beam of electromagnetic radiation focused on said selected one of said subdivisions for heating said selected one of said subdivisions above said threshold temperature, thereby causing each magnetic domain in said subdivision to represent a logical 0, said subdivision thereby being erased;

means for aligning said bias magnetic field in the direction representing logical 1;

means for modulating said beam for writing a predetermined pattern of logical bits into said subdivision;

means for causing said coherent beam generating means to generate a second coherent beam of electromagnetic radiation having a first, predetermined polarization and for reflecting said second beam from said magnetic domains in said subdivision, said beam after reflection from one of said magnetic domains having a second polarization indicative of the alignment direction of said magnetic domain, for reading said subdivision;

means for comparing data read from said subdivision with said predetermined pattern;

means for recording in said status information record maintaining means that said subdivision is formatted if said data read from said subdivision compares with said predetermined pattern and for recording that said subdivision is bad if said data does not compare; and means for re-erasing said subdivision if said data compares with said predetermined pattern.

13. The formatting system of claim 12 wherein said formatting means further comprises means for assigning an alternate subdivision in place of a bad subdivision and for recording said assignment in said status information record maintaining means.

14. For use in a computer system having at least one high density data storage medium, said data storage medium having a large number of data storage subdivisions and requiring lengthy format times, a method for formatting said medium on a time-distributed basis, said formatting method comprising the steps of:

maintaining a record of status information for each of said subdivisions, said status information including an indication of whether of not said subdivision has been formatted;

determining when said computer system is disk-idle;

selecting an unformatted one of said subdivisions when said computer system is disk-idle; and formatting an unformatted one of said subdivisions responsive to one of (a) selection of said unformatted one of said subdivisions upon a determination that said computer system is disk-idle, and (b) a need by said computer system for access to a formatted one of said subdivisions when said status information record indicates that no formatted subdivisions exist.

15. In computer system having a main memory and having a magneto-optical data storage medium of a type having data subdivisions which must be erased before they can be written on, a system for erasing previously used data subdivisions before they are needed again, said erasing system comprising:

means for maintaining a table of previously-used, formatted, erased data subdivisions;

means for maintaining a list of previously -used formatted data subdivisions to be erased;

means for automatically determining when said computer system is disk-idle;

means response to said disk-idle determining means and to said list maintaining means for automatically selecting from said list one of said previously-used subdivisions to be erased when said computer system is disk-idle; and means for automatically erasing one of said subdivisions responsive to one of (a) selection by said selecting means of said one of said subdivisions upon a determination by said determining means that said computer system is disk-idle, and (b) a need by said computer system for access to one of said subdivisions when said table maintaining means indicates that no erased subdivisions exist.

16. The erasing system of claim 15 wherein said table maintaining means comprises means for storing a table on said medium, said table indicating the status of each of said subdivisions.

17. The erasing system of claim 15 wherein said list maintaining means comprises means for storing in said main memory a list of subdivisions to be erased.

18. The erasing system of claim 15 wherein;

said magneto-optic data storage medium has magnetic domains aligned in one of two directions representing logical 0 and logical 1 and having a magnet for applying a bias magnetic field, alignment of said magnetic domains being substantially fixed at room temperatures, said magnetic field at temperatures above a threshold temperature, said data storage medium further having associated therewith means for generating a beam of coherent electromagnetic radiation for heating said medium to said threshold temperature for aligning said domains as desired; and said erasing means comprises:

means for aligning said bias magnetic field in the direction representing logical 0;

means for causing said coherent beam generating means to generate a coherent beam of electromagnetic radiation focused on said selected one of said subdivisions for heating said selected one of said subdivisions above said threshold temperature, thereby causing each magnetic domain in aid subdivision to represent a logical 0, said subdivision thereby being erased; and means for recording in said list maintaining means that said subdivision is erased.

19. The erasing system of claim 15 wherein said list maintaining means comprises means for adding to said list, whenever a file is deleted, those ones of said subdivisions used by said file.

20. In a computer system having a high density data storage medium with a large number of data storage subdivisions, a system for operating with the data storage medium, comprising:

means for maintaining a record of status information for each of said subdivisions, said status information including an indication of whether or not each such subdivision is in an available state for immediately recording data by having a predetermined erased status or is in an unavailable state for said immediate recording by not having said predetermined erased status;

means for indicating when the computer system is idle with respect to the data storage medium;

means connected to and being responsive to said idle indicating means and to said indication of said maintaining means for selecting an unavailable one of said subdivisions for changing said selected subdivision from said unavailable state to said available state when said computer system is idle with respect to said record medium; and means responsive to said indicating means indicating that said computer system is idle with respect to said data storage medium for changing said selected subdivision from said unavailable state to said available states, said changing states including erasing said selected subdivision to said predetermined erased status.

* * * * *